(12) United States Patent
Lesage et al.

(10) Patent No.: US 7,620,302 B2
(45) Date of Patent: Nov. 17, 2009

(54) HIGH EFFICIENCY, PEAK POWER REDUCING, DOMESTIC HOT WATER HEATER

(75) Inventors: Claude Lesage, Pointe Claire (CA); Jean-Claude Lesage, Kirkland (CA)

(73) Assignee: Giant Factories Inc., Montréal, Québec (CA)

( * ) Notice: Subject to any disclaimer, the term of this patent is extended or adjusted under 35 U.S.C. 154(b) by 342 days.

(21) Appl. No.: 11/556,798

(22) Filed: Nov. 6, 2006

(65) Prior Publication Data

US 2008/0107409 A1    May 8, 2008

(51) Int. Cl.
*F24H 1/20* (2006.01)
(52) U.S. Cl. .................. 392/454; 392/455; 392/464
(58) Field of Classification Search .......... 392/454, 392/464
See application file for complete search history.

(56) References Cited

U.S. PATENT DOCUMENTS

| | | | | |
|---|---|---|---|---|
| 1,996,625 A | * | 4/1935 | Pendleton | 392/464 |
| 2,307,061 A | * | 1/1943 | Morrow | 392/464 |
| 3,353,002 A | * | 11/1967 | Macoicz et al. | 392/454 |
| 4,023,043 A | * | 5/1977 | Stevenson | 307/38 |
| 4,948,948 A | | 8/1990 | Lesage | |
| 5,808,277 A | * | 9/1998 | Dosani et al. | 219/481 |
| 6,465,764 B1 | * | 10/2002 | Shahin | 219/486 |
| 6,785,466 B1 | * | 8/2004 | Jackson et al. | 392/454 |

\* cited by examiner

*Primary Examiner*—Thor S Campbell
(74) *Attorney, Agent, or Firm*—Ogilvy Renault LLP

(57) ABSTRACT

A high efficiency, peak-power reducing, domestic hot water heater is described. It comprises a closed tank having a predetermined water holding capacity. A hot water outlet is provided in a top end wall of the tank. A cold water inlet is provided in a side wall of the tank adjacent a bottom wall thereof. Three spaced apart resistive heating elements project substantially horizontally in the tank. A bottom one of the resistive heating elements extends in the tank and spaced slightly above the bottom wall. A middle one of the resistive heating elements extends in the tank at a level close to an average maximum water consumption volume drawn during a peak power demand time period. A top one of the resistive heating elements extends between the middle element and the top end wall of the tank. The bottom element has a low watt density in the range of from about 15 to 30 W/in$^2$.

9 Claims, 3 Drawing Sheets

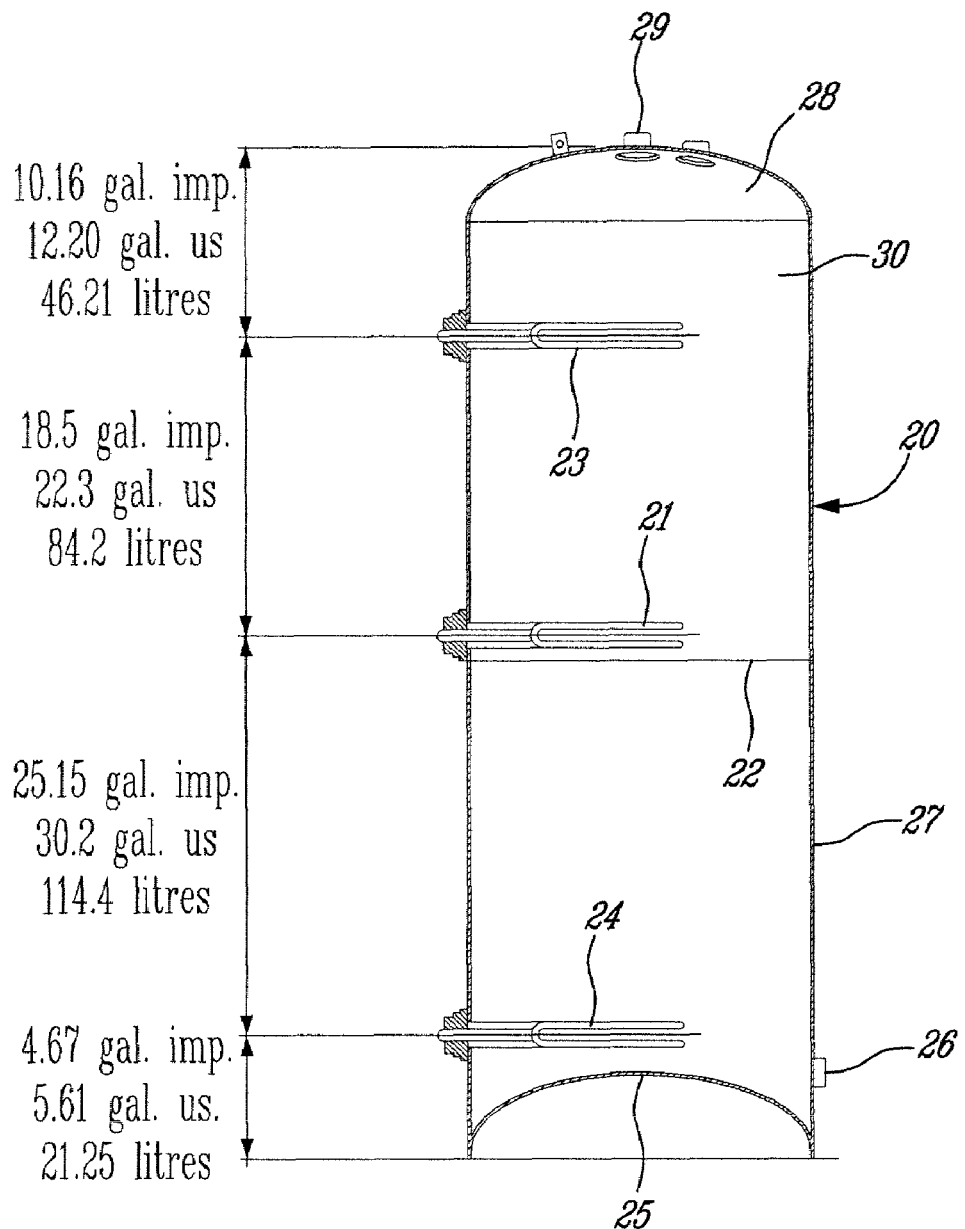
FIG_2

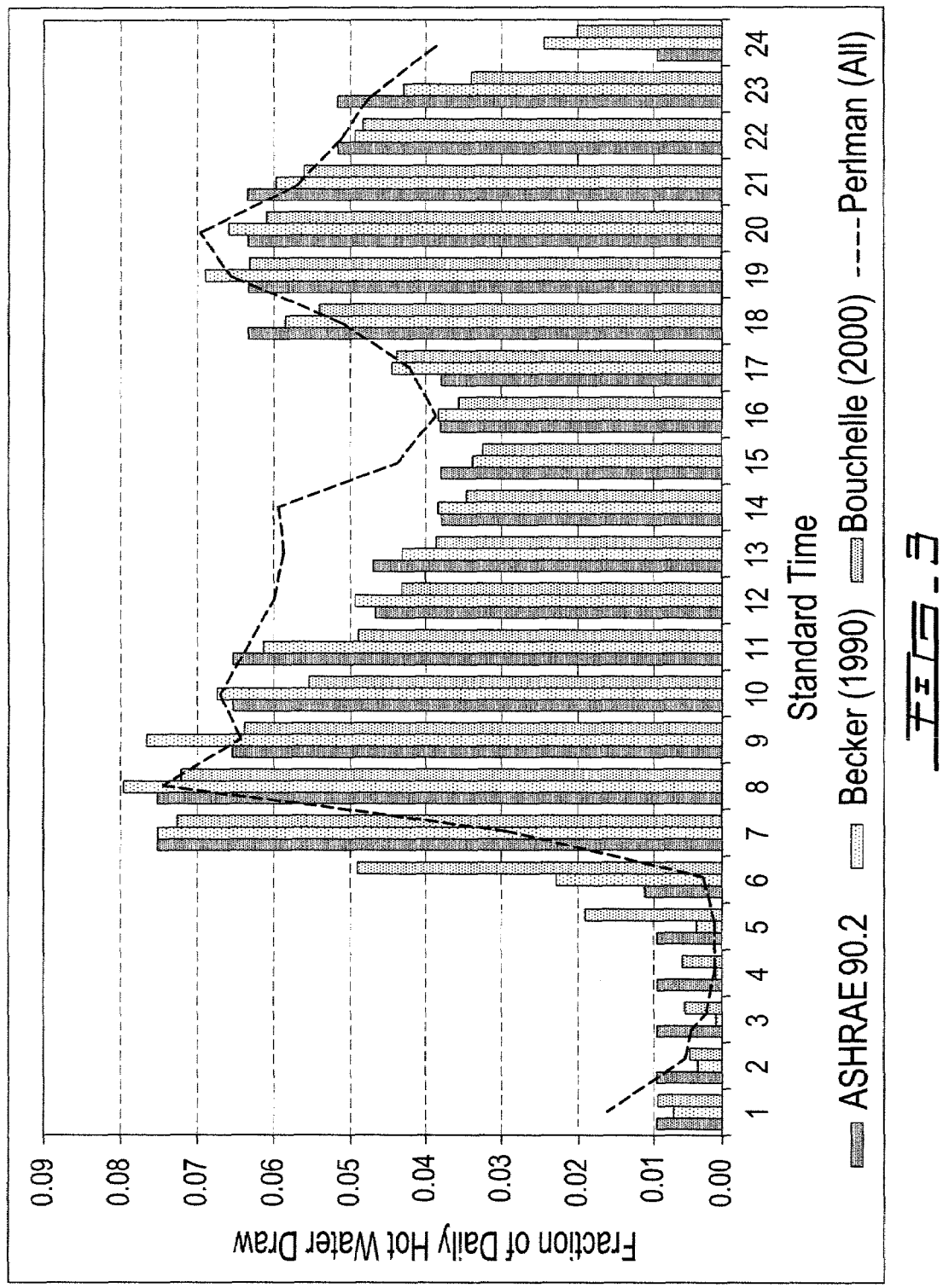

HIGH EFFICIENCY, PEAK POWER REDUCING, DOMESTIC HOT WATER HEATER

TECHNICAL FIELD

The present invention relates to a high efficiency, peak-power reducing, domestic hot water heater provided with three resistive heating elements and wherein a middle one of these elements is disposed at a predetermined level in the tank of the hot water heater, which level exceeds the average maximum water consumption volume drawn during a peak power demand time period. The method of operation is also part of the invention.

BACKGROUND ART

In U.S. Pat. No. 4,948,948, there is described a water heater with multiple heating elements having different power factors and wherein these elements are controlled by a control circuit so that the elements are switched on at different periods of a day, outside peak hours, in order to reduce the power loads on an electrical distribution network during peak electrical power demand periods. During peak hours when hot water is used, normally between 6:00 a.m. and 9:00 a.m. and 6:00 p.m. to 9:00 p.m., there is an excessive demand of power on the electrical distribution network. Electrical utilities have been searching for adequate solutions to this problem and one such solution is to increase the cost of electricity during peak periods of time thereby forcing consumers to use hot water at different periods of time whereby to try and reduce the demand during peak power periods. Another solution is for utilities to control the domestic circuits branched to high power rated appliances during this peak period of time and such controls have to be done remotely or with timers. These solutions are, however, costly to the utilities and are not popular with consumers. They also cause very high instantaneous demand when they are re-activated if too many units are turned back in at the same time. The patent referred to hereinabove also discusses other attempts by utilities to control power consumption during peak demand periods and some of these solutions can be very troublesome.

As described in U.S. Pat. No. 4,948,948 the resistive elements are of different power ratings with the top one of the elements being the highest power rated for heating a small volume of water in the top portion of the reservoir where water is drawn out of the tank to maintain the water in top portion at the set hot water temperature. However, during peak periods of time the amount of water in the top portion of the reservoir is quickly exhausted as it has been found that many consumers will draw hot water during a single peak period of the day rather than two separate periods and therefore demand a much larger hot water volume.

SUMMARY OF INVENTION

It is a feature of the present invention to provide a high efficiency, peak-power reducing, domestic hot water heater which overcomes the above-mentioned disadvantages of the prior art.

Another feature of the present invention is to provide a high efficiency, peak-power reducing, domestic hot water heater having three spaced-apart resistive heating elements which is an improvement of the hot water heater described in the afore-mentioned U.S. Patent.

Another feature of the present invention is to provide a high efficiency, peak-power reducing, domestic hot water heater having three spaced-apart resistive heating elements mounted in a tank having a capacity of 270 liters and 20 inch or less diameter and wherein a low watt density resistive heating element is mounted at the bottom of the tank.

Another feature of the present invention is to provide a high efficiency, peak-power reducing, domestic hot water heater and wherein the middle resistive heating element is disposed at a level exceeding an average maximum water consumption volume of water drawn during a peak-power demand time period.

According to the above features, from a broad aspect, the present invention provides a high efficiency, peak-power reducing, domestic hot water heater is described. It comprises a closed tank having a predetermined water holding capacity. A hot water outlet is provided in a top end wall of the tank. A cold water inlet is provided in a side wall of the tank adjacent a bottom wall thereof. Three spaced apart resistive heating elements project substantially horizontally in the tank. A bottom one of the resistive heating elements extends in the tank spaced slightly above the bottom wall. A middle one of the resistive heating elements extends in the tank at a level calculated at approximately an average maximum water consumption volume of water drawn during a peak power demand time period. A top one of the resistive heating elements extends between the middle element and the top end wall of the tank. The bottom element has a low watt density in the range of from about 15 to 30 W/in$^2$.

According to a further broad aspect of the present invention there is provided a method of reducing the kilowatt demand of a domestic hot water heater during peak hour periods without reducing the amount of hot water requested by a user using a large volume of hot water between 90 to 150 liters from a hot water tank having a predetermined water holding capacity. The method comprises the steps of providing a hot water tank with three spaced-apart electrical resistive heating elements extending therein in a spaced-apart manner. The bottom one of the resistive heating elements has a low watt density rating in the range of from about 15 to 30 W/in$^2$. A middle one of the resistive heating elements is positioned at a level calculated at approximately an average maximum water consumption of between about 90 to 130 liters dependent on the tank size of about 180 or 270 liters.

According to a further broad aspect of the preset invention the method further comprises operating the middle resistive heating element to maintain a water temperature at its level to approximately 140° F. to form a barrier in the hot water tank to reduce the propagation of harmful bacteria from the bottom of the tank towards a top portion of the tank where hot water is drawn.

BRIEF DESCRIPTION OF DRAWINGS

A preferred embodiment of the present invention will now be described with reference to the accompanying drawings in which:

FIG. 2 is a comparable schematic section view of the high efficiency, peak-power reducing, domestic hot water tank of the present invention; and FIG. 3 is a graph illustrating comparisons of different fractional daily hot water draws.

DESCRIPTION OF PREFERRED EMBODIMENTS

Figure 1:
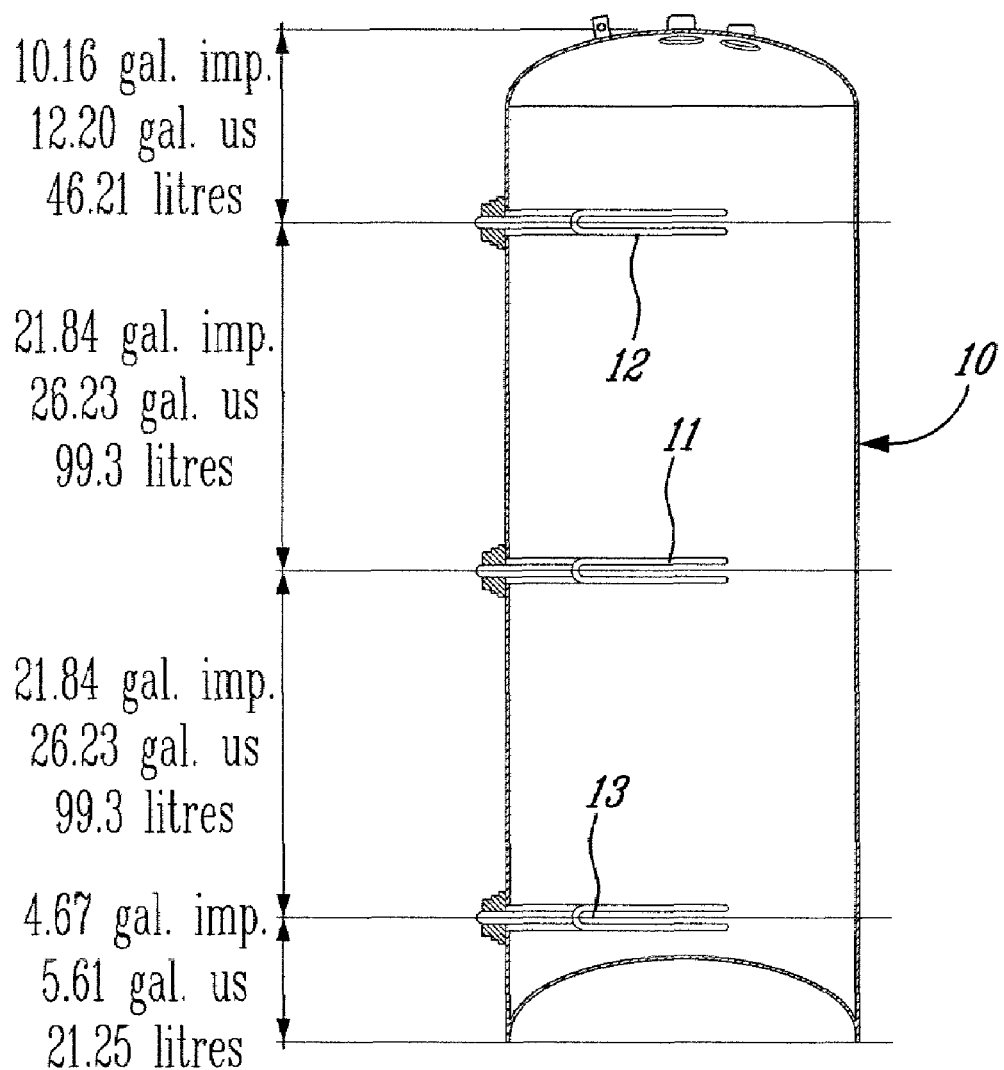
FIG. 1 is a schematic section view showing a hot water tank constructed in accordance with the prior art.

Although it is stated in the referred-to U.S. Patent that any size of tank can be used, one must be careful in the actual position of the elements in order to insure that end users do not run out of hot water and that the intermediate element does not activate unless absolutely necessary. Furthermore, it is not recommendable that the actual size of the tank be less than 270 liters in cold climate geographical areas due to the fact that a smaller tank will not provide the appropriate amount of hot-water requested by a user during peak periods. Warmer climates where tank inlet water temperatures are higher than in northern areas of North-America, could most likely allow smaller volume tanks such as 180 liters. Nonetheless, hot water drawing trends must be looked at. As such, the following table exposes figures of the average hot water consumption. These were taken from ASHRAE Standard.

| | Average Hot Water Use, L | | | | | | | |
|---|---|---|---|---|---|---|---|---|
| | Hourly | | Daily | | Weekly | | Monthly | |
| Group | OVL | Peak | OVL | Peak | OVL | Peak | OVL | Peak |
| All families | 9.8 | 17.3 | 236 | 254 | 1652 | 1873 | 7178 | 7700 |
| "Typical" families | 9.9 | 21.9 | 239 | 252 | 1673 | 1981 | 7270 | 7866 |

One can easily see that the peak water consumption must be taken into account as to eliminate the possibility of lacking hot water. Thus, the amount for typical daily hot water consumption can be set at a minimum amount of 254 liters per day.

Another study realized by the Florida Solar Energy Center clearly indicates that the consumption is slightly more. The graph shown in FIG. 3 compares different fractional daily hot water draw profile compelled by various organizations. The graph is a comparison of SRCC, Becker (1990), and ASHRAE Standard 90.2 hot water draw profiles showing similarity between Becker (1990) and ASHRAE Standard 90.2. The graph is taken from a Florida Solar Energy Center Research Report, Jul. 20, 2004.

Knowing that the graph indicates fractional draws, one must take into consideration the size of the tank in use. Assuming that the water heater in use is a 270 liter tank, by extrapolating the values in the graph to the volume of the tank, we obtain the following table.

| | ASHRAE | | Becker | |
|---|---|---|---|---|
| Hour | Fraction of daily hot water draw | Volume according to tank size | Fraction of daily hot water draw | Volume according to tank size |
| 1 | 0.009 | 2.430 | 0.006 | 1.620 |
| 2 | 0.009 | 2.430 | 0.003 | 0.810 |
| 3 | 0.009 | 2.430 | 0.001 | 0.270 |
| 4 | 0.009 | 2.430 | 0.001 | 0.270 |
| 5 | 0.009 | 2.430 | 0.003 | 0.810 |
| 6 | 0.010 | 2.700 | 0.022 | 5.940 |
| 7 | 0.075 | 20.250 | 0.075 | 20.250 |
| 8 | 0.075 | 20.250 | 0.080 | 21.600 |
| 9 | 0.065 | 17.550 | 0.077 | 20.790 |
| 10 | 0.065 | 17.550 | 0.067 | 18.090 |
| 11 | 0.065 | 17.550 | 0.061 | 16.470 |
| 12 | 0.047 | 12.690 | 0.049 | 13.230 |
| 13 | 0.047 | 12.690 | 0.042 | 11.340 |
| 14 | 0.038 | 10.260 | 0.038 | 10.125 |
| 15 | 0.038 | 10.260 | 0.034 | 9.180 |
| 16 | 0.038 | 10.260 | 0.038 | 10.260 |
| 17 | 0.038 | 10.260 | 0.044 | 11.880 |
| 18 | 0.063 | 17.010 | 0.058 | 15.660 |

-continued

| | ASHRAE | | Becker | |
|---|---|---|---|---|
| Hour | Fraction of daily hot water draw | Volume according to tank size | Fraction of daily hot water draw | Volume according to tank size |
| 19 | 0.063 | 17.010 | 0.069 | 18.630 |
| 20 | 0.063 | 17.010 | 0.065 | 17.550 |
| 21 | 0.063 | 17.010 | 0.059 | 15.930 |
| 22 | 0.051 | 13.770 | 0.049 | 13.230 |
| 23 | 0.051 | 13.770 | 0.043 | 11.610 |
| 24 | 0.009 | 2.430 | 0.024 | 6.480 |
| Total | 1.009 | 272.430 | 1.008 | 272.025 |

From this table, we can clearly see that an entire tank is usually used up in one day by an average family. However, care must be taken in interpreting this as this profile may not cover exceptions. One must keep in mind that it is crucial to avoid lack of hot water particularly where people tend to concentrate their consumption in one peak period of a day rather than two, i.e. morning and nighttime. As such the hot water drawn can be as high as 130 to 150 liters. Therefore, in order to always satisfy demand and to avoid increasing peak power demand from the utilities the volume of water to be heated by the bottom element should be set at approximately 130 liters.

Referring now to FIGS. 1 and 2, there is shown an example of a 20 inch diameter 270 liters water heater tank with FIG. 1 representing the tank of the prior patent referred to and FIG. 2 the tank of the present invention. Although a few sizes of tanks can be used, it is preferable to have the tank as high as possible in order to take full advantage of the stratification effect of hot and cold water in the tank in order to reduce water temperature diffusion. In other words, a shorter, stubbier tank of equal volume will have more difficulty to deliver as much hot water as a taller, slimmer one. Furthermore, the water heater must be capable of meeting the required specifications of the CSA delivery test stated in C191 Standards.

Although the previous design is made to meet the demand of a typical consumer, variations of this can be made for people who consume more or less water. The actual positions of the elements are all related proportionally to the volumes of water to be heated as per the extrapolations demonstrated above with the comparison chart taken from the Solar Energy Research Center. For example, one could design a smaller tank for people that consume very little hot water, such as about 175 liters, (38.5 US gallons). When extrapolating the values from our graph, we obtain the following table.

| | ASHRAE | | Becker | |
|---|---|---|---|---|
| Hour | Fraction of daily hot water draw | Volume according to tank size | Fraction of daily hot water draw | Volume according to tank size |
| 1 | 0.009 | 1.575 | 0.006 | 1.050 |
| 2 | 0.009 | 1.575 | 0.003 | 0.525 |
| 3 | 0.009 | 1.575 | 0.001 | 0.175 |
| 4 | 0.009 | 1.575 | 0.001 | 0.175 |
| 5 | 0.009 | 1.575 | 0.003 | 0.525 |
| 6 | 0.010 | 1.750 | 0.022 | 3.850 |
| 7 | 0.075 | 13.125 | 0.075 | 13.125 |
| 8 | 0.075 | 13.125 | 0.080 | 14.000 |
| 9 | 0.065 | 11.375 | 0.077 | 13.475 |
| 10 | 0.065 | 11.375 | 0.067 | 11.725 |
| 11 | 0.065 | 11.375 | 0.061 | 10.675 |

-continued

| | ASHRAE | | Becker | |
|---|---|---|---|---|
| Hour | Fraction of daily hot water draw | Volume according to tank size | Fraction of daily hot water draw | Volume according to tank size |
| 12 | 0.047 | 8.225 | 0.049 | 8.575 |
| 13 | 0.047 | 8.225 | 0.042 | 7.350 |
| 14 | 0.038 | 6.650 | 0.038 | 6.563 |
| 15 | 0.038 | 6.650 | 0.034 | 5.950 |
| 16 | 0.038 | 6.650 | 0.038 | 6.650 |
| 17 | 0.038 | 6.650 | 0.044 | 7.700 |
| 18 | 0.063 | 11.025 | 0.058 | 10.150 |
| 19 | 0.063 | 11.025 | 0.069 | 12.075 |
| 20 | 0.063 | 11.025 | 0.065 | 11.375 |
| 21 | 0.063 | 11.025 | 0.059 | 10.325 |
| 22 | 0.051 | 8.925 | 0.049 | 8.575 |
| 23 | 0.051 | 8.925 | 0.043 | 7.525 |
| 24 | 0.009 | 1.575 | 0.024 | 4.200 |
| Total | 1.009 | 176.575 | 1.008 | 176.313 |

We can see once again that peak period consumption is relatively high. Using the same reasoning as before, we can assume with great certainty that a below average user that concentrates his use of hot water during one period rather than two could use about 90 liters. Thus, the intermediate element would have to be positioned as to never be activated before approximately 90 or more liters of water would be consumed.

From the above study one can therefore conclude that a consumer that draws hot water during a single peak demand period will draw from anywhere between 90 to 130 liters. Thus, with reference to FIG. 1, it can be seen that with the 270 liter prior art tank 10 the central resistive heating element 11 would be rendered operative as it is disposed at a level of about 130 liters. Accordingly as soon as the consumption approaches 130 liters the central element is switched on therefore increasing power demand on the power distribution network. Also, the top resistive element 12 is located at a level in the uppermost portion of the tank and heats approximately 12 gallons of water but that element has a large power rating of 3800 watts to 4500 watts or more. However, this element is only turned on when the heater is plugged in for the first time, or if the consumer uses up most of the hot water in the tank. The lowermost resistive element 13 has a power rating of 800 watts or less but that element is on most of the time and because of this, the lifespan of that element is much shorter than the other elements therefore must be designed accordingly to increase life. As previously mentioned, the purpose of the three resistive elements and their locations together with a control circuit is to heat the water during very low power demand periods, for example between 8:00 p.m. and 7:00 a.m. to slowly bring the water to a usable hot temperature. Therefore, during morning and early evening peak power demand periods there should be ample hot water to be drawn from the tank. However, if, as described hereinabove, many consumers only demand hot water during only one peak period of time during a day, thereby demanding much larger volumes, the supply of hot water from a hot water heater may not be adequate and the top resistive heating element is switched on increasing the load on the network of the utility. Thermostat accuracy must also be considered because if they are not precise from one to the other, the resistive heating elements will not be activated at the right time, thus not meeting delivery tests.

FIG. 2 shows the improved design of the domestic hot water heater of the present invention and utilizes a tank 20 similar to the one as described in the prior art, namely a tank of 270 liters, having a diameter of about 20 inches but wherein the middle resistive heating element 21 is disposed as near as possible to the average maximum water consumption volume drawn during a single peak hour demand time period. This maximum water volume is identified by the level 22. Accordingly, the middle resistive heating element 21 will not be activated by a consumer drawing hot water during a single peak demand time period. Another important feature of the high efficiency, peak-power reducing, domestic hot water heater 20 of the present invention is that the bottom heating element 24 has a low watt density rating in the range of from about 15 to 30 W/in$^2$. It is also disposed close to the bottom wall 25 of the tank similar to that as shown in FIG. 1. It is to be noted here that a cold water inlet 26 is connected to the side wall 27 and adjacent the bottom wall 25 whereby not to create too much turbulence at the bottom of the tank, as is the case with top entry tanks where the feed tube extends in the tank vertically downwards from the top wall 28 of the tank. Turbulence causes water to mix in large volume taking more time to supply hot water, thus reducing the amount of hot water available, at the top of the tank and entraining bacteria in the top region of the tank where hot water is drawn. In both tanks 10 and 20, the hot water outlet 29 is connected to the top wall to draw the hot water in the top portion 30 of the tank. Also, the top resistive heating element 25 extends substantially at the same height as with the prior art tank 10 and as hereinshown is at a level wherein there are approximately 46.21 liters of water thereabove for a 270 liter tank.

It is further pointed out that the positions of the resistive heating elements 21, 23 and 24 also provide for efficient water temperature stratification within the tank thereby reducing diffusion of the cold water introduced at the bottom of the tank in a non-turbulent manner. This ensures that the top portion 30 of the tank has an adequate supply of hot water. Further, the middle heating element produces a heat barrier in the water within the tank and the temperature in the vicinity of the middle resistive heating element is in the range of about 140° F. and this reduces the propagation of harmful bacteria such as legionnela to the hot water top portion 30 of the tank.

The tank as shown in FIG. 2 is a 270 liter tank and the bottom heating element extends at a water level of about 20 liters from the bottom. The middle resistive heating element 21 extends at a water level of about 130 liters from the bottom wall 25 whereas the top heating element extends at a water level of about 220 liters from the bottom wall 25. As previously described this top resistive heating element 23 is at a distance of about 46 or less liters from the top wall 28.

It is important that the bottom resistive heating element be of a low watt density rating to have an extended life, as this element will operate almost all of the time to maintain the set hot water temperature of the tank. This bottom resistive heating element 24 has a sheath which can be made of copper, stainless steel or other suitable materials. The resistance is typically made of a nickel-chromium alloy surrounded by magnesium oxide powder or other suitable materials. It is also important that the surface watts load of the coil be kept at a minimum to increase its life. Although many means can be used to accomplish this, one means is to increase the gauge of the resistance wire.

Typical domestic water heaters are equipped with screw-type elements that have a watt output value ranging anywhere from 1500 to 5500 watts. The surface load density, expressed in watts per square inch of tube surface, usually ranges from 80 to 130 W/in$^2$. This surface load is also present on the resistance inside of the element and ranges usually from 2 to 4 times the surface load of the tube. It is known that the higher the surface load of the coil as well as the tube, the shorter is the expected life of the element. Furthermore, these elements are designed to operate in cycles. They heat the water on demand for the period of time required for it to heat the water to the desired temperature. The higher the output rating of the element (Watts), the shorter it will take for it to heat a definite volume of water. Inversely, the lower the output, the longer it will take to heat the water.

Since it is important that the bottom element 24 lasts just as long as the tank itself, it must be built for that purpose. The most important factor that must be taken in consideration is that the lower resistive heating element 24, which is rated at 800 watt, will operate continuously for a very long period of time until the water in the tank reaches the set thermostat temperature. As such the following criteria must be respected. The bottom resistive element 24 must have an increased life and therefore has a very low watt surface load of 15-30 W/in$^2$), a heavy resistance gauge (1-2 wire gauge oversize), be of premium quality material for the resistance (High grade Nickel-Chromium Alloy), be of resistor style design, bolt-on instead of screw-in attachment, and must have a premium quality grade MgO (magnesium oxide powder), and fusion welds on pin-coil assemblies and electrical contacts.

One can therefore appreciate that the high efficiency, peak-power reducing, domestic hot water heater tank 20 of the present invention has important specific features which produce beneficial results and one of these important features is the position of the middle resistive heating element which creates a second tempered zone in a predetermined area of the tank which lies around the average maximum water consumption volume drawn during a peak power demand time period. That middle element also provides a temperature barrier of about 140° F. thereby preventing bacteria from migrating to the top hot water portion of the tank. Further, the bottom resistive heating element is rated to outlast the life of the tank as it operates most of the time to maintain the set hot water temperature of the tank.

It is within the ambit of the present invention to cover any obvious modifications of the preferred embodiment described herein, provided such modifications fall within the scope of the appended claims.

We claim:

1. A high efficiency peak-power reducing domestic hot water heater comprising a closed tank having a predetermined water holding capacity, a hot water outlet in a top end wall of said tank, a cold water inlet in a side wall of said tank adjacent a bottom wall thereof, three spaced apart resistive heating elements projecting substantially horizontally in said tank, said resistive heating elements being positioned to provide efficient water temperature stratification of water within said tank, a bottom one of said resistive heating elements extending in said tank spaced slightly above said bottom wall, a middle one of said resistive heating elements extending in said tank at a level which is calculated at approximately an average maximum water consumption volume drawn during a peak power demand time period, and a top one of said resistive heating element extending between said middle element and said top end wall of said tank, said top resistive element having a large power rating of between 3800 to 4500 watts, said middle resistive heating element producing a heat barrier in said water within said tank at the level of said middle resistive heating element in the range of about 140° F. to reduce the propagation of harmful bacteria to said hot water supply in said top portion of said tank, said middle resistive heating element being disposed above mid-level of said tank, said bottom resistive heating element having a low watt density rating in the range of from about 15 to 30 W/in$^2$, said bottom heating element having a life rating which is higher than said middle and top heating elements.

2. A high efficiency peak-power reducing domestic hot water heater as claimed in claim 1 wherein said average maximum water consumption volume is in the range of about 90 to 130 liters.

3. A high efficiency peak-power reducing domestic hot water heater as claimed in claim 1 wherein said tank is a cylindrical tank having a diameter of about 20 inches or less in order to produce an efficient water temperature stratification between hot and cold water in said tank and thereby reduce water temperature diffusion and ensuring a constant hot water supply in a top portion of said tank.

4. A high efficiency peak-power reducing domestic hot water heater as claimed in claim 1 wherein said harmful bacteria is legionnela bacteria.

5. A high efficiency peak-power reducing domestic hot water heater as claimed in claim 1 wherein said tank has a water capacity of about 270 liters, said bottom heating element extends at a water level of about 20 liters from said bottom wall, said middle heating element extending at a water level of about 130 liters from said bottom wall and said top heating element extends at a water level of about 220 liters from said bottom wall.

6. A high efficiency peak-power reducing domestic hot water heater as claimed in claim 5 wherein said top heating element is spaced from said top wall of said tank a distance equivalent to a water volume of about 46 liters.

7. A high efficiency peak-power reducing domestic hot water heater as claimed in claim 1 wherein said bottom resistive heating element has a metal sheath made from one of copper, incaloy or stainless steel, and wherein a magnesium oxide surrounds a central coil thereof.

8. A high efficiency peak-power reducing domestic hot water heater as claimed in claim 1 wherein said bottom resistive heating element is a bolt-on resistive heating element.

9. A high efficiency peak-power reducing domestic hot water heater as claimed in claim 1 wherein said water holding capacity of said tank is about 180 liters or about 270 liters.

* * * * *